United States Patent
Lu et al.

(10) Patent No.: US 8,670,251 B2
(45) Date of Patent: Mar. 11, 2014

(54) REGULATING APPARATUS WITH SOFT-START AND FAST-SHUTDOWN FUNCTION

(75) Inventors: Jung-Chang Lu, New Taipei (TW); Chi-Shin Chu, New Taipei (TW); Chung-Shu Lee, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 278 days.

(21) Appl. No.: 13/367,926

(22) Filed: Feb. 7, 2012

(65) Prior Publication Data

US 2013/0200876 A1 Aug. 8, 2013

(51) Int. Cl.
*H02M 1/36* (2007.01)

(52) U.S. Cl.
USPC ............... 363/49; 323/901; 323/908

(58) Field of Classification Search
CPC ........................................ H02M 1/36
USPC ..................... 363/49; 323/901, 908
See application file for complete search history.

(56) References Cited

U.S. PATENT DOCUMENTS

| | | | | |
|---|---|---|---|---|
| 6,778,411 B2 * | 8/2004 | Huang | ............................ | 363/49 |
| 2007/0116577 A1 * | 5/2007 | Chen et al. | ........................ | 417/7 |
| 2011/0102052 A1 * | 5/2011 | Billingsley et al. | ........... | 327/365 |

* cited by examiner

*Primary Examiner* — Harry Behm
(74) *Attorney, Agent, or Firm* — Chun-Ming Shih; HDLS IPR Services

(57) ABSTRACT

A regulating apparatus with soft-start and fast-shutdown function is applied to a voltage-supplying apparatus. The regulating apparatus includes a soft-start and fast-shutdown circuit, a regulating circuit, and a ground circuit. When voltages are supplied from the voltage-supplying apparatus to the soft-start and fast-shutdown circuit, the regulating circuit, and the ground circuit, the ground circuit is connected to ground, so that the starting time of the regulating circuit is delayed by the soft-start and fast-shutdown circuit. When voltages are not supplied from the voltage-supplying apparatus to the soft-start and fast-shutdown circuit, the regulating circuit, and the ground circuit, the ground circuit is not connected to ground, so that the regulating circuit is shut down fast by the soft-start and fast-shutdown circuit.

10 Claims, 3 Drawing Sheets

REGULATING APPARATUS WITH SOFT-START AND FAST-SHUTDOWN FUNCTION

BACKGROUND OF THE INVENTION

1. Field of the Invention

The present invention relates to a regulating apparatus, and especially relates to a regulating apparatus with soft-start and fast-shutdown function.

2. Description of Prior Art

A regulator is designed to automatically maintain a constant voltage level. A regulator may be a simple feed-forward design or may include negative feedback control loops. A regulator may use an electromechanical mechanism or electronic components. Depending on the design, a regulator may be used to regulate one or more AC or DC voltages.

Regulators are found in devices such as power supplies where they stabilize the DC voltages used by the processor and other elements. In automobile alternators and central power station generator plants, regulators control the output of the plant. In an electric power distribution system, regulators may be installed at a substation or along distribution lines so that all customers receive steady voltage independent of how much power is drawn from the line.

The purpose of soft-start function is to avoid electromagnetic interference caused by inrush current when the electronic device is started. However, the disadvantage of the conventional regulator is that the conventional regulator does not have both soft-start function (when power is on) and fast-shutdown function (when power is off).

SUMMARY OF THE INVENTION

In order to solve the above-mentioned problems, an object of the present invention is to provide a regulating apparatus with soft-start and fast-shutdown function.

In order to achieve the object of the present invention mentioned above, the regulating apparatus with soft-start and fast-shutdown function of the present invention is applied to a voltage-supplying apparatus. The regulating apparatus with soft-start and fast-shutdown function includes a voltage input terminal, a soft-start and fast-shutdown circuit, a first terminal, a regulating circuit, a ground circuit, and a voltage output terminal. The voltage input terminal is electrically connected to the voltage-supplying apparatus. The soft-start and fast-shutdown circuit is electrically connected to the voltage input terminal. The first terminal is electrically connected to the soft-start and fast-shutdown circuit. The regulating circuit is electrically connected to the voltage input terminal, the soft-start and fast-shutdown circuit, and the first terminal. The ground circuit is electrically connected to the first terminal and the voltage-supplying apparatus. The voltage output terminal is electrically connected to the regulating circuit. The soft-start and fast-shutdown circuit includes a first capacitor, a first diode, a first resistor, and a first transistor switch. One side of the first capacitor is electrically connected to the voltage input terminal. The cathode of the first diode is electrically connected to the regulating circuit. The anode of the first diode is electrically connected to the other side of the first capacitor. One side of the first resistor is electrically connected to the other side of the first capacitor. The other side of the first resistor is electrically connected to the first terminal. The first side of the first transistor switch is electrically connected to the voltage input terminal. The second side of the first transistor switch is electrically connected to the first terminal. The third side of the first transistor switch is electrically connected to the other side of the first capacitor. When voltages are supplied from the voltage-supplying apparatus to the voltage input terminal and the ground circuit, the ground circuit is connected to ground, so that the first terminal is connected to ground, and then the starting time of the regulating circuit is delayed by the soft-start and fast-shutdown circuit. When voltages are not supplied from the voltage-supplying apparatus to the voltage input terminal and the ground circuit, the ground circuit is not connected to ground, so that the first terminal is not connected to ground, and then the regulating circuit is shut down fast by the soft-start and fast-shutdown circuit.

DETAILED DESCRIPTION OF THE INVENTION

Figure 1:
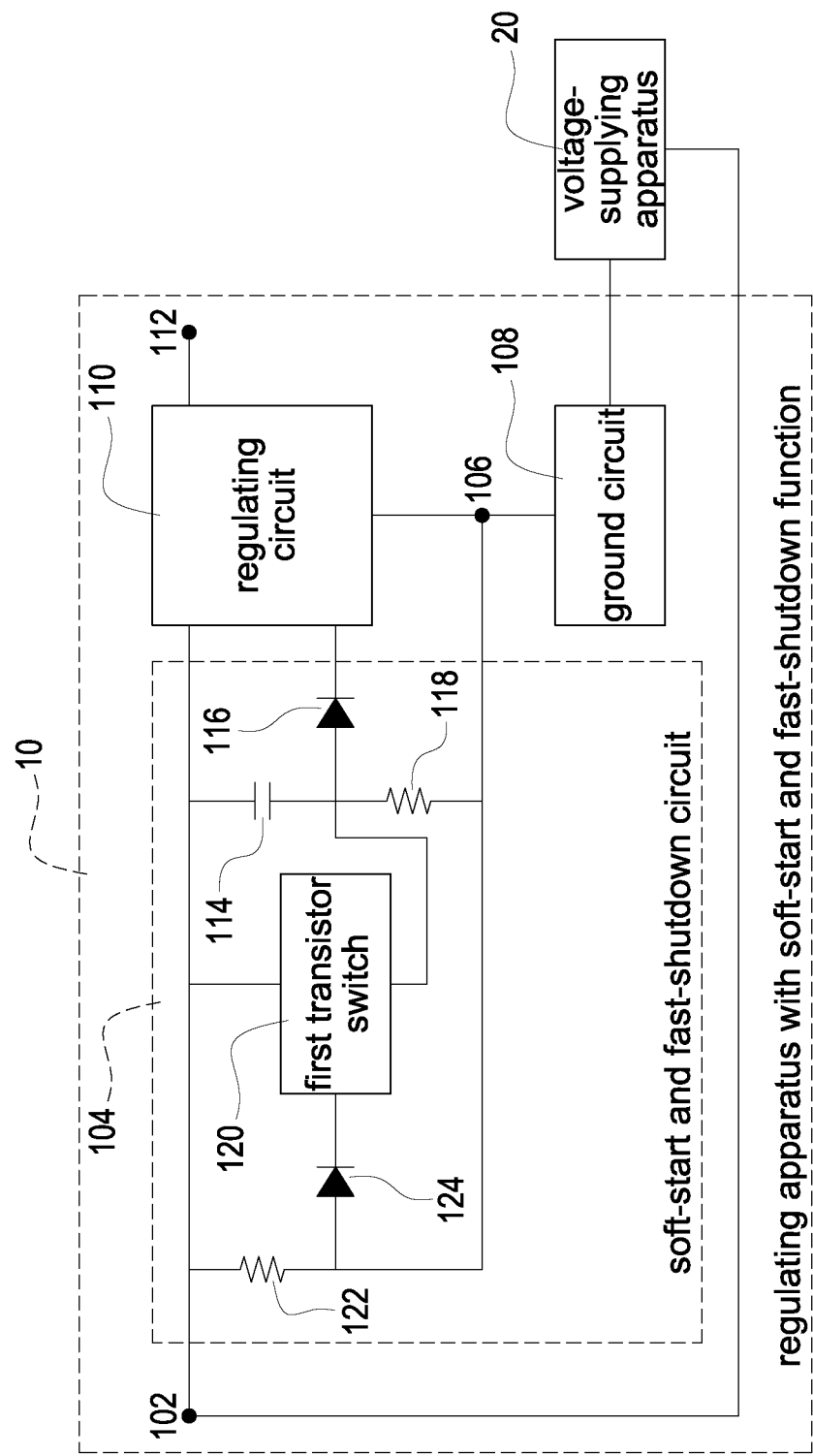
FIG. 1 shows a block diagram of the regulating apparatus with soft-start and fast-shutdown function of the present invention.

FIG. 1 shows a block diagram of the regulating apparatus with soft-start and fast-shutdown function of the present invention. The regulating apparatus with soft-start and fast-shutdown function 10 of the present invention is applied to a voltage-supplying apparatus 20. The regulating apparatus with soft-start and fast-shutdown function 10 includes a voltage input terminal 102, a soft-start and fast-shutdown circuit 104, a first terminal 106, a regulating circuit 110, a ground circuit 108, and a voltage output terminal 112.

The voltage input terminal 102 is electrically connected to the voltage-supplying apparatus 20, the soft-start and fast-shutdown circuit 104, and the regulating circuit 110. The first terminal 106 is electrically connected to the soft-start and fast-shutdown circuit 104, the regulating circuit 110, and the ground circuit 108. The ground circuit 108 is electrically connected to the voltage-supplying apparatus 20. The regulating circuit 110 is electrically connected to the soft-start and fast-shutdown circuit 104, and the voltage output terminal 112.

The soft-start and fast-shutdown circuit 104 includes a first capacitor 114, a first diode 116, a first resistor 118, a first transistor switch 120, a second resistor 122, and a second diode 124.

The voltage input terminal 102 is electrically connected to one side of the second resistor 122, the first side of the first transistor switch 120, and one side of the first capacitor 114. The second side of the first transistor switch 120 is electrically connected to the cathode of the second diode 124. The other side of the first capacitor 114 is electrically connected to the anode of the first diode 116, one side of the first resistor 118, and the third side of the first transistor switch 120. The first terminal 106 is electrically connected to the other side of the second resistor 122, the anode of the second diode 124, and the other side of the first resistor 118. The cathode of the first diode 116 is electrically connected to the regulating circuit 110.

Figure 2:
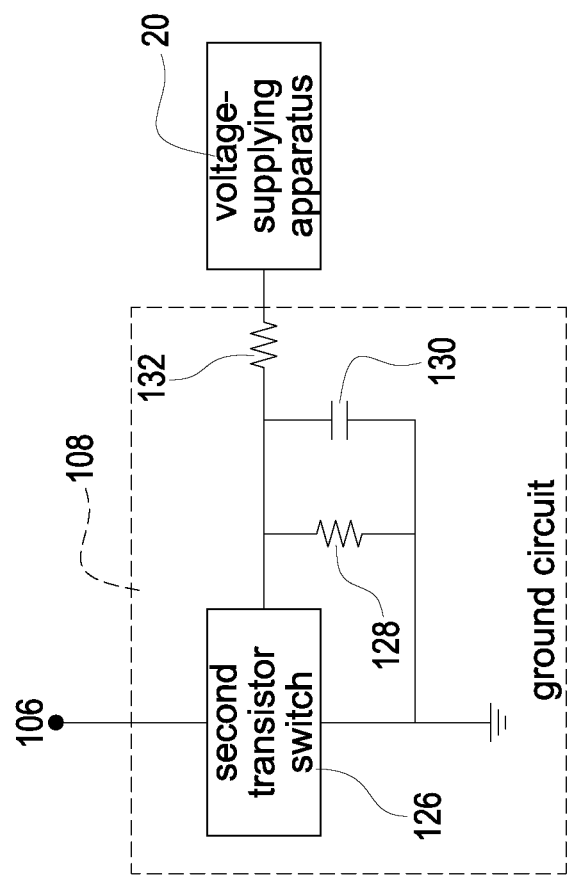
FIG. 2 shows a block diagram of the ground circuit of the present invention.

FIG. 2 shows a block diagram of the ground circuit of the present invention. The ground circuit 108 includes a second transistor switch 126, a third resistor 128, a second capacitor 130, and a fourth resistor 132.

The first side of the second transistor switch 126 is electrically connected to the first terminal 106. The second side of the second transistor switch 126 is electrically connected to one side of the third resistor 128, one side of the second capacitor 130, and one side of the fourth resistor 132. The third side of the second transistor switch 126 is electrically connected to ground. The other side of the third resistor 128 is electrically connected to ground. The other side of the second capacitor 130 is electrically connected to ground. The other side of the fourth resistor 132 is electrically connected to the voltage-supplying apparatus 20.

Figure 3:
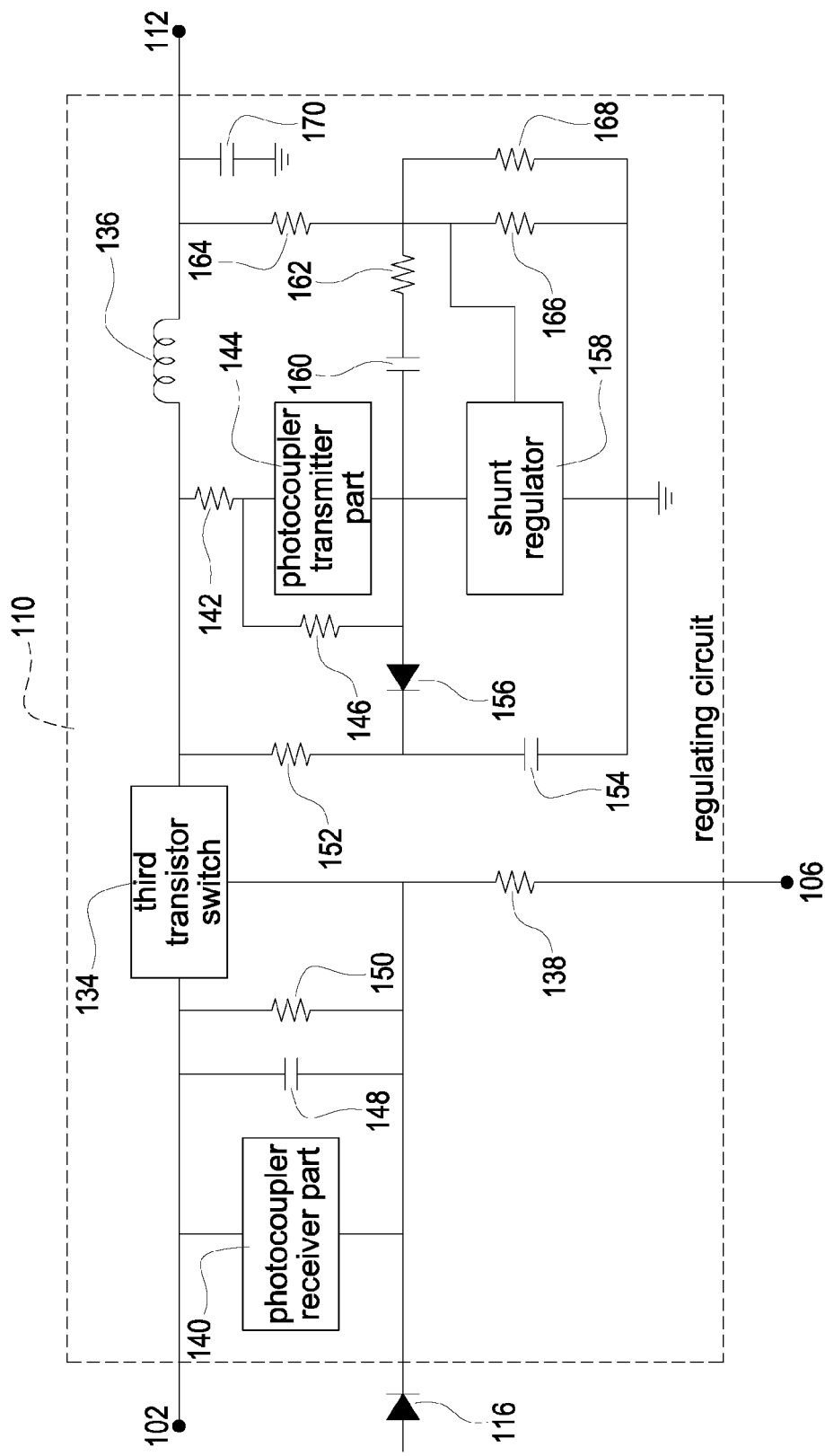
FIG. 3 shows a block diagram of the regulating circuit of the present invention.

FIG. 3 shows a block diagram of the regulating circuit of the present invention. The regulating circuit 110 includes a third transistor switch 134, a first inductor 136, a fifth resistor 138, a photocoupler receiver part 140, a sixth resistor 142, a photocoupler transmitter part 144, a seventh resistor 146, a third capacitor 148, an eighth resistor 150, a ninth resistor 152, a fourth capacitor 154, a third diode 156, a shunt regulator 158, a fifth capacitor 160, a tenth resistor 162, an eleventh resistor 164, a twelfth resistor 166, a thirtieth resistor 168, and a sixth capacitor 170.

The voltage input terminal 102 is electrically connected to one side of the photocoupler receiver part 140, one side of the third capacitor 148, one side of the eighth resistor 150, and the first side of the third transistor switch 134. The cathode of the first diode 116 is electrically connected to the other side of the photocoupler receiver part 140, the other side of the third capacitor 148, the other side of the eighth resistor 150, the second side of the third transistor switch 134, and one side of the fifth resistor 138. The other side of the fifth resistor 138 is electrically connected to the first terminal 106.

The third side of the third transistor switch 134 is electrically connected to one side of the ninth resistor 152, one side of the sixth resistor 142, and one side of the first inductor 136. The voltage output terminal 112 is electrically connected to the other side of the first inductor 136, one side of the eleventh resistor 164, and one side of the sixth capacitor 170. The other side of the sixth capacitor 170 is electrically connected to ground. The other side of the ninth resistor 152 is electrically connected to one side of the fourth capacitor 154, and the cathode of the third diode 156. The other side of the fourth capacitor 154 is electrically connected to ground.

The other side of the sixth resistor 142 is electrically connected to one side of the photocoupler transmitter part 144, and one side of the seventh resistor 146. The other side of the photocoupler transmitter part 144 is electrically connected to the anode of the third diode 156, the other side of the seventh resistor 146, the first side of the shunt regulator 158, and one side of the fifth capacitor 160. The other side of the fifth capacitor 160 is electrically connected to one side of the tenth resistor 162.

The second side of the shunt regulator 158 is electrically connected to the other side of the tenth resistor 162, the other side of the eleventh resistor 164, one side of the twelfth resistor 166, and one side of the thirtieth resistor 168. The third side of the shunt regulator 158 is electrically connected to ground. The other side of the twelfth resistor 166 is electrically connected to ground. The other side of the thirtieth resistor 168 is electrically connected to ground.

Please refer to FIG. 1, FIG. 2, and FIG. 3 again. When voltages are supplied from the voltage-supplying apparatus 20 to the voltage input terminal 102 and the ground circuit 108 (namely, when power is on), the ground circuit 108 is connected to ground (because the second transistor switch 126 is conducted to ground), so that the first terminal 106 is connected to ground, and then the starting time of the regulating circuit 110 is delayed by the soft-start and fast-shutdown circuit 104 (the starting time of the regulating circuit 110 is delayed by the first capacitor 114, the first diode 116, the first resistor 118, and other components).

When voltages are not supplied from the voltage-supplying apparatus 20 to the voltage input terminal 102 and the ground circuit 108 (namely, when power is off), the ground circuit 108 is not connected to ground (because the second transistor switch 126 is not conducted), so that the first terminal 106 is not connected to ground, and then the regulating circuit 110 is shut down fast by the soft-start and fast-shutdown circuit 104 (the regulating circuit 110 is shut down by a fast discharge loop which includes the first capacitor 114, the first diode 116, the first transistor switch 120, and other components).

Moreover, the ground circuit 108 is not limited to FIG. 2. Other ground circuits having similar grounding effect would be used in the present invention. The regulating circuit 110 is not limited to FIG. 3. Other regulating circuits having similar regulating effect would be used in the present invention.

The regulating apparatus with soft-start and fast-shutdown function of the present invention has both soft-start function (when power is on) and fast-shutdown function (when power is off).

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A regulating apparatus with soft-start and fast-shutdown function applied to a voltage-supplying apparatus, the regulating apparatus with soft-start and fast-shutdown function including:
    a voltage input terminal electrically connected to the voltage-supplying apparatus;
    a soft-start and fast-shutdown circuit electrically connected to the voltage input terminal;
    a first terminal electrically connected to the soft-start and fast-shutdown circuit;
    a regulating circuit electrically connected to the voltage input terminal, the soft-start and fast-shutdown circuit, and the first terminal;
    a ground circuit electrically connected to the first terminal and the voltage-supplying apparatus; and
    a voltage output terminal electrically connected to the regulating circuit,
    wherein the soft-start and fast-shutdown circuit includes:
    a first capacitor, one side of the first capacitor being electrically connected to the voltage input terminal;
    a first diode, the cathode of the first diode being electrically connected to the regulating circuit, the anode of the first diode being electrically connected to the other side of the first capacitor;
    a first resistor, one side of the first resistor being electrically connected to the other side of the first capacitor, the other side of the first resistor being electrically connected to the first terminal; and
    a first transistor switch, the first side of the first transistor switch being electrically connected to the voltage input terminal, the second side of the first transistor switch being electrically connected to the first terminal, the third side of the first transistor switch being electrically connected to the other side of the first capacitor; when voltages are supplied from the voltage-supplying apparatus to the voltage input terminal and the ground circuit, the ground circuit is connected to ground, so that the first terminal is connected to ground, and then the starting time of the regulating circuit is delayed by the soft-start and fast-shutdown circuit; when voltages are not supplied from the voltage-supplying apparatus to the voltage input terminal and the ground circuit, the ground circuit is not connected to ground, so that the first terminal is not connected to ground, and then the regulating circuit is shut down fast by the soft-start and fast-shutdown circuit.

2. The regulating apparatus with soft-start and fast-shutdown function in claim 1, wherein the soft-start and fast-shutdown circuit further includes a second resistor, one side of the second resistor being electrically connected to the voltage input terminal, the other side of the second resistor being electrically connected to the first terminal.

3. The regulating apparatus with soft-start and fast-shutdown function in claim 2, wherein the soft-start and fast-shutdown circuit further includes a second diode, the cathode of the second diode being electrically connected to the second side of the first transistor switch, the anode of the second diode being electrically connected to the first terminal.

4. The regulating apparatus with soft-start and fast-shutdown function in claim 3, wherein the ground circuit includes a second transistor switch, the first side of the second transistor switch being electrically connected to the first terminal, the second side of the second transistor switch being electrically connected to the voltage-supplying apparatus, the third side of the second transistor switch being electrically connected to ground.

5. The regulating apparatus with soft-start and fast-shutdown function in claim 4, wherein the ground circuit further includes:
- a third resistor, one side of the third resistor being electrically connected to the second side of the second transistor switch, the other side of the third resistor being electrically connected to ground;
- a second capacitor, one side of the second capacitor being electrically connected to the second side of the second transistor switch, the other side of the second capacitor being electrically connected to ground; and
- a fourth resistor, one side of the fourth capacitor being electrically connected to the second side of the second transistor switch, the other side of the fourth capacitor being electrically connected to the voltage-supplying apparatus.

6. The regulating apparatus with soft-start and fast-shutdown function in claim 5, wherein the regulating circuit includes:
- a third transistor switch, the first side of the third transistor switch being electrically connected to the voltage input terminal, the second side of the third transistor switch being electrically connected to the cathode of the first diode;
- a first inductor, one side of the first inductor being electrically connected to the third side of the third transistor switch, the other side of the first inductor being electrically connected to the voltage output terminal; and
- a fifth resistor, one side of the fifth resistor being electrically connected to the cathode of the first diode, the other side of the fifth resistor being electrically connected to the first terminal.

7. The regulating apparatus with soft-start and fast-shutdown function in claim 6, wherein the regulating circuit further includes:
- a photocoupler receiver part, one side of the photocoupler receiver part being electrically connected to the voltage input terminal, the other side of the photocoupler receiver part being electrically connected to the cathode of the first diode;
- a sixth resistor, one side of the sixth resistor being electrically connected to the third side of the third transistor switch;
- a photocoupler transmitter part, one side of the photocoupler transmitter part being electrically connected to the other side of the sixth resistor; and
- a seventh resistor, one side of the seventh resistor being electrically connected to the other side of the sixth resistor, the other side of the seventh resistor being electrically connected to the other side of the photocoupler transmitter part.

8. The regulating apparatus with soft-start and fast-shutdown function in claim 7, wherein the regulating circuit further includes:
- a third capacitor, one side of the third capacitor being electrically connected to the voltage input terminal, the other side of the third capacitor being electrically connected to the cathode of the first diode;
- an eighth resistor, one side of the eighth resistor being electrically connected to the voltage input terminal, the other side of the eighth resistor being electrically connected to the cathode of the first diode;
- a ninth resistor, one side of the ninth resistor being electrically connected to the third side of the third transistor switch; and
- a fourth capacitor, one side of the fourth capacitor being electrically connected to the other side of the ninth resistor, the other side of the fourth capacitor being electrically connected to ground.

9. The regulating apparatus with soft-start and fast-shutdown function in claim 8, wherein the regulating circuit further includes:
- a third diode, the cathode of the third diode being electrically connected to the other side of the ninth resistor, the anode of the third diode being electrically connected to the other side of the photocoupler transmitter part;
- a shunt regulator, the first side of the shunt regulator being electrically connected to the other side of the photocoupler transmitter part, the third side of the shunt regulator being electrically connected to ground;
- a fifth capacitor, one side of the fifth capacitor being electrically connected to the other side of the photocoupler transmitter part; and
- a tenth resistor, one side of the tenth resistor being electrically connected to the other side of the fifth capacitor, the other side of the tenth resistor being electrically connected to the second side of the shunt regulator.

10. The regulating apparatus with soft-start and fast-shutdown function in claim 9, wherein the regulating circuit further includes:
- an eleventh resistor, one side of the eleventh resistor being electrically connected to the voltage input terminal, the other side of the eleventh resistor being electrically connected to the second side of the shunt regulator;
- a twelfth resistor, one side of the twelfth resistor being electrically connected to the second side of the shunt regulator, the other side of the twelfth resistor being electrically connected to ground;
- a thirtieth resistor, one side of the thirtieth resistor being electrically connected to the second side of the shunt regulator, the other side of the thirtieth resistor being electrically connected to ground; and a sixth capacitor, one side of the sixth capacitor being electrically connected to the voltage output terminal, the other side of the sixth capacitor being electrically connected to ground.

* * * * *